US009865166B2

(12) United States Patent
Nordbruch

(10) Patent No.: US 9,865,166 B2
(45) Date of Patent: Jan. 9, 2018

(54) SYSTEM AND METHOD FOR DETECTING A PARTICULAR OCCUPANCY STATUS OF MULTIPLE PARKING POSITIONS OF A PARKING FACILITY

(71) Applicant: Robert Bosch GmbH, Stuttgart (DE)

(72) Inventor: Stefan Nordbruch, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/226,102

(22) Filed: Aug. 2, 2016

(65) Prior Publication Data

US 2017/0039852 A1    Feb. 9, 2017

(30) Foreign Application Priority Data

Aug. 4, 2015   (DE) .......................... 10 2015 214 811

(51) Int. Cl.
| | |
|---|---|
| *B60Q 1/48* | (2006.01) |
| *G08G 1/14* | (2006.01) |
| *G01S 17/88* | (2006.01) |
| *G06K 9/00* | (2006.01) |
| *G08G 1/04* | (2006.01) |
| *G01S 13/88* | (2006.01) |

(52) U.S. Cl.
CPC ................ *G08G 1/14* (2013.01); *G01S 17/88* (2013.01); *G06K 9/0063* (2013.01); *G06K 9/00812* (2013.01); *G08G 1/04* (2013.01); *G08G 1/146* (2013.01); *B64C 2201/127* (2013.01); *G01S 13/88* (2013.01)

(58) Field of Classification Search
CPC .......... G08G 1/14; G08G 1/141; G08G 1/142; G08G 1/144; G08G 1/148; B60Q 1/48; B60R 2300/806
USPC ....................................... 340/932.2
See application file for complete search history.

(56) References Cited

U.S. PATENT DOCUMENTS

| | | | | |
|---|---|---|---|---|
| 6,104,314 | A * | 8/2000 | Jiang ........................ | 340/932.2 |
| 6,285,297 | B1 | 9/2001 | Ball | |
| 8,704,680 | B1 * | 4/2014 | Zhang ....................... | 340/932.2 |
| 2015/0009047 | A1 * | 1/2015 | Ashkenazi ............. | G08G 1/144 340/932.2 |
| 2015/0142533 | A1 * | 5/2015 | Shalev ................... | G06Q 50/30 705/13 |
| 2015/0227952 | A1 * | 8/2015 | Dance .................... | G06Q 10/04 705/7.31 |

(Continued)

FOREIGN PATENT DOCUMENTS

| | | |
|---|---|---|
| DE | 199 44 311 A1 | 3/2001 |
| DE | 10 2014 223 931 A1 | 5/2016 |

*Primary Examiner* — Brent Swarthout
(74) *Attorney, Agent, or Firm* — Norton Rose Fulbright US LLP; Gerard Messina

(57) ABSTRACT

A system for detecting a particular occupancy status of multiple parking positions of a parking facility, which includes a parking occupancy sensor for detecting an occupancy status of a parking position, a displacement device for displacing the parking occupancy sensor along the parking positions, so that, due to a displacement of the parking occupancy sensor along the parking positions, the parking occupancy sensor is able to detect the particular occupancy status of the parking positions. A corresponding method, a corresponding parking facility for vehicles and a computer program are also described.

7 Claims, 2 Drawing Sheets

(56) References Cited

U.S. PATENT DOCUMENTS

2016/0093214 A1* 3/2016 Wu ................. G08G 1/147
                                                        348/148
2016/0371609 A1* 12/2016 Nordbruch ............ G06Q 10/02

* cited by examiner

SYSTEM AND METHOD FOR DETECTING A PARTICULAR OCCUPANCY STATUS OF MULTIPLE PARKING POSITIONS OF A PARKING FACILITY

CROSS REFERENCE

The present application claims the benefit under 35 U.S.C. §119 of German Patent Application No. DE 102015214811.4 filed on Aug. 4, 2015, which is expressly incorporated herein by reference in its entirety.

FIELD

The present invention relates to a system and a method for detecting a particular occupancy status of multiple parking positions of a parking facility. Moreover, the present invention relates to a parking facility for vehicles. Furthermore, the present invention relates to a computer program.

BACKGROUND INFORMATION

Parking occupancy sensors which detect an occupancy status of a parking position of a parking facility are conventional. For example, such parking occupancy sensors are glued or screwed onto a floor covering of a parking space, so that the parking occupancy sensors mounted in this way are able to detect when a vehicle is parked or is not parked above them.

A disadvantage of this procedure in particular is that a separate parking occupancy sensor must be used for each of the parking positions of the parking facility.

SUMMARY

An object of the present invention is to provide an efficient system and method which is able to efficiently detect a particular occupancy status of multiple parking positions of a parking facility.

According to one aspect of the present invention, a system for detecting a particular occupancy status of multiple parking positions of a parking facility is provided which includes:
  a parking occupancy sensor for detecting an occupancy status of a parking position,
  a displacement device for displacing the parking occupancy sensor along the parking positions, so that, due to a displacement of the parking occupancy sensor along the parking positions, the parking occupancy sensor is able to detect the particular occupancy status of the parking positions.

According to yet another aspect of the present invention, a method for detecting a particular occupancy status of multiple parking positions of a parking facility is provided which includes the following steps:
  displacing a parking occupancy sensor for detecting an occupancy status of a parking position along multiple parking positions of a parking facility,
  detecting the particular occupancy status of the parking positions with the aid of the parking occupancy sensor during the displacement.

According to another aspect, a parking facility for vehicles is provided which includes multiple parking positions and the system for detecting a particular occupancy status of multiple parking positions of a parking facility.

According to another aspect, a computer program is provided which includes program code for carrying out the method for detecting a particular occupancy status of multiple parking positions of a parking facility when the computer program is executed on a computer.

The present invention thus includes in particular, and among other things, the concept of no longer providing a separate parking occupancy sensor for each parking position, the parking occupancy sensor being stationarily situated, for example, on a floor covering of the particular parking positions. Instead, the present invention is based on a mobile parking occupancy sensor, which due to its mobility is able to detect the particular occupancy status of multiple parking positions. Thus, only one parking occupancy sensor is necessary for being able to detect a particular occupancy status of multiple parking positions. This results in particular in the technical advantage that the particular occupancy status of the multiple parking positions of the parking facility may be efficiently detected.

The parking occupancy sensor obtains its mobility due to the displacement device, which displaces, i.e., moves, the parking occupancy sensor along the parking positions. This means that the displacement device moves the parking occupancy sensor along the parking positions. The parking occupancy sensor may thus be referred to as a mobile parking occupancy sensor, and is thus a movably situated parking occupancy sensor.

According to one specific embodiment, it is provided that the displacement device includes an unmanned aircraft.

This results in particular in the technical advantage that the parking occupancy sensor may fly over the parking positions. This means in particular that the parking occupancy sensor is situated on the aircraft. The aircraft thus flies the parking occupancy sensor over the parking positions.

According to another specific embodiment, it is provided that the displacement device includes an unmanned land vehicle.

This results in particular in the technical advantage that the parking occupancy sensor may travel on a floor of the parking facility. Thus, for example, the parking occupancy sensor is situated on the land vehicle. The land vehicle then moves the parking occupancy sensor along the parking positions.

According to another specific embodiment, it is provided that the displacement device includes a track and/or a cable for the directed guidance of the parking occupancy sensor along the track and/or the cable.

This results in particular in the technical advantage that the parking occupancy sensor may be moved or guided along the parking positions in a directed manner. Due to the cable and/or the track, a movement direction or displacement direction for the parking occupancy sensor is thus efficiently specified.

Thus, for example, according to one specific embodiment it is provided that the unmanned land vehicle travels on the track and/or on the cable.

Thus, for example, according to one specific embodiment it is provided that the unmanned aircraft is movably fastened to the track and/or the cable, and thus flies or is able to fly along the track and/or the cable. This may result, for example, in the technical advantage that the aircraft may be efficiently prevented from flying away in an uncontrolled manner.

According to another specific embodiment, it is provided that the displacement device is designed for periodically displacing the parking occupancy sensor along the parking positions.

This results in particular in the technical advantage that the parking positions may be efficiently monitored. A periodic displacement means in particular that the parking occupancy sensor is periodically moved back and forth between two different positions, i.e., with a predetermined frequency.

According to another specific embodiment, it is provided that the displacement device is designed for carrying out the displacement of the parking occupancy sensor in response to an external control signal.

This results in particular in the technical advantage that the displacement may be efficiently carried out. Thus, with the aid of the external control signal, for example, the displacement of the parking occupancy sensor may be advantageously initiated, triggered, or actuated. This means in particular that, based on the external control signal, the displacement device begins with the displacement of the parking occupancy sensor.

According to another specific embodiment, it is provided that a surroundings sensor system for detecting the surroundings of the parking positions is provided, the displacement device being designed for displacing the parking occupancy sensor based on the detected surroundings.

This results in particular in the technical advantage that the parking occupancy sensor may be efficiently displaced. Thus, for example, with the aid of the detected surroundings, areas may be identified in which it is meaningful to detect the occupancy status of the parking positions situated in these areas. For example, with the aid of the surroundings detection, it may be detected when vehicles are moving in a certain area of the surroundings. This is an indication in particular that an occupancy status of a parking position has possibly changed. In this regard, it is then meaningful to move the parking occupancy sensor toward this area of the surroundings in order to check whether or not a particular occupancy status of the parking positions in question has changed.

According to one specific embodiment, it is provided that the system for detecting a particular occupancy status of multiple parking positions of a parking facility is designed for executing or carrying out the method for detecting a particular occupancy status of multiple parking positions of a parking facility.

According to one specific embodiment, it is provided that the method for detecting a particular occupancy status of multiple parking positions of a vehicle is carried out with the aid of the system for detecting a particular occupancy status of multiple parking positions of a parking facility.

According to one specific embodiment, it is provided that the parking facility is designed for executing or carrying out the method for detecting a particular occupancy status of multiple parking positions of a parking facility.

Technical functionalities concerning the method similarly result from corresponding technical functionalities concerning the system, and vice versa.

According to one specific embodiment, the parking occupancy sensor is one of the following sensors: radar sensor, LIDAR sensor, laser sensor, ultrasonic sensor, video sensor, infrared sensor, or magnetic sensor. Such sensors are thus in particular surroundings sensors, with the aid of which the surroundings may be detected by sensing.

According to one specific embodiment, it is provided that the surroundings sensor system includes one or more of the following surroundings sensors: radar sensor, LIDAR sensor, laser sensor, ultrasonic sensor, video sensor, infrared sensor, and/or magnetic sensor.

A vacant parking position refers to a parking position at which no vehicle is present for the purpose of parking. The parking position is thus free of a vehicle.

An occupied parking position refers to a parking position at which a vehicle is present for the purpose of parking. This means that a vehicle is parked at an occupied parking position.

According to one specific embodiment, the vehicle is a motor vehicle, in particular a passenger vehicle or a truck. The motor vehicle is a two-wheeled motor vehicle, for example, such as a motorcycle.

This means in particular that the parking occupancy sensor detects whether or not a vehicle is present at a parking position. The parking occupancy sensor transmits this occupancy status to a parking facility management server via a communication network, for example. The parking facility management server may then, for example, plot or enter the particular detected occupancy status in a digital map of the parking facility.

Within the meaning of the present invention, a parking facility forms a contiguous area which is made up of multiple parking spaces for a parking facility on private property, or multiple parking positions for a parking facility on public property. According to one specific embodiment, it is provided that the parking facility is designed as a parking garage. In another specific embodiment, it is provided that the parking facility is designed as a parking deck.

This means that the parking positions correspond to the parking spaces on private property (for a parking facility on private property) or to the parking spaces on public property (for a parking facility on public property).

The parking positions are visually separated from one another with the aid of parking space markings, for example.

According to one specific embodiment, it is provided that only one parking occupancy sensor is provided.

In another specific embodiment, multiple parking occupancy sensors are provided which are appropriately displaced with the aid of the displacement device.

For multiple parking occupancy sensors, according to one specific embodiment it is provided that the displacement device includes, for example, multiple unmanned aircraft and/or multiple unmanned land vehicles and/or multiple tracks and/or multiple cables. The statements made in conjunction with one parking occupancy sensor similarly apply to multiple parking occupancy sensors. The parking occupancy sensors are displaced in each case, for example, with the aid of different elements of the displacement device. A parking occupancy sensor is displaced, for example, with the aid of an unmanned land vehicle. Another parking occupancy sensor is displaced, for example, with the aid of an unmanned aircraft. Yet another parking occupancy sensor is displaced with the aid of cables, for example.

Although multiple parking occupancy sensors are provided here, the number of parking occupancy sensors required for detecting the occupancy status of the parking positions may be efficiently reduced compared to the case in which a separate parking occupancy sensor is used for each parking position.

According to one specific embodiment, the land vehicle is a track-guided land vehicle.

According to one specific embodiment, the unmanned aircraft is designed as a helicopter or quadcopter, or as an airship.

According to one specific embodiment, the unmanned land vehicle is designed as an unmanned motor vehicle.

According to one specific embodiment, the unmanned aircraft and/or the unmanned land vehicle are/is designed for being remote controlled and/or for traveling and/or flying autonomously.

The present invention is explained in greater detail below with reference to preferred exemplary embodiments.

BRIEF DESCRIPTION OF THE DRAWINGS

Identical reference numerals may be used below for the same features.

DETAILED DESCRIPTION OF EXAMPLE EMBODIMENTS

Figure 1:
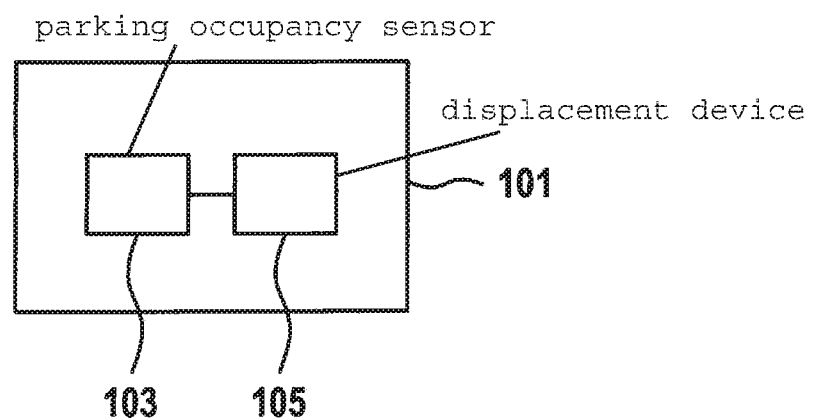
FIG. 1 shows a system for detecting a particular occupancy status of multiple parking positions of a parking facility.

FIG. 1 shows a system 101 for detecting a particular occupancy status of multiple parking positions of a parking facility, and includes:
- a parking occupancy sensor 103 for detecting an occupancy status of a parking position,
- a displacement device 105 for displacing the parking occupancy sensor along the parking positions, so that, due to a displacement of the parking occupancy sensor along the parking positions, the parking occupancy sensor is able to detect the particular occupancy status of the parking positions.

Figure 2:
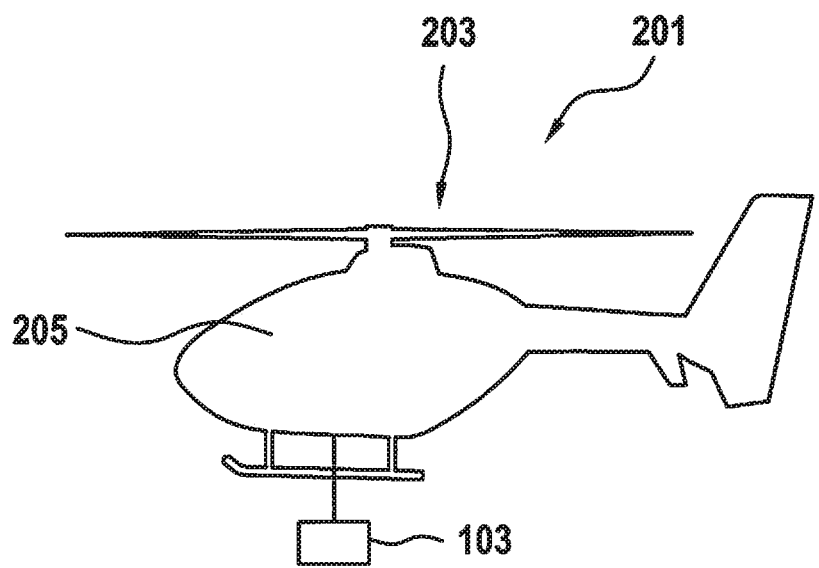
FIG. 2 shows another system for detecting a particular occupancy status of multiple parking positions of a parking facility.

FIG. 2 shows another system 201 for detecting a particular occupancy status of multiple parking positions of a parking facility.

System 201 includes a parking occupancy sensor 103 for detecting an occupancy status of a parking position. System 201 also includes a displacement device 203 for displacing parking occupancy sensor 103 along the parking positions, so that, due to a displacement of parking occupancy sensor 103 along the parking positions, parking occupancy sensor 103 is able to detect the particular occupancy status of the parking positions.

Displacement device 203 includes an unmanned aircraft 205, which in the exemplary embodiment according to FIG. 2 is designed as a helicopter. Parking occupancy sensor 103 is situated on helicopter 205. For detecting the particular occupancy status of the parking positions, helicopter 205 flies over the parking positions. For example, it is provided that helicopter 205 is remote-controlled. For example, it is provided that helicopter 205 flies autonomously.

In another specific embodiment, displacement device 203 may include a quadcopter as an alternative or in addition to helicopter 205.

According to another specific embodiment, it is provided that displacement device 203, instead of or in addition to helicopter 205, includes an unmanned land vehicle, for example an unmanned motor vehicle. The unmanned land vehicle thus travels, for example, on a floor of the parking facility, past the parking positions. Parking occupancy sensor 103 situated on the land vehicle may then detect a particular occupancy status of the parking positions while traveling past.

Figure 3:
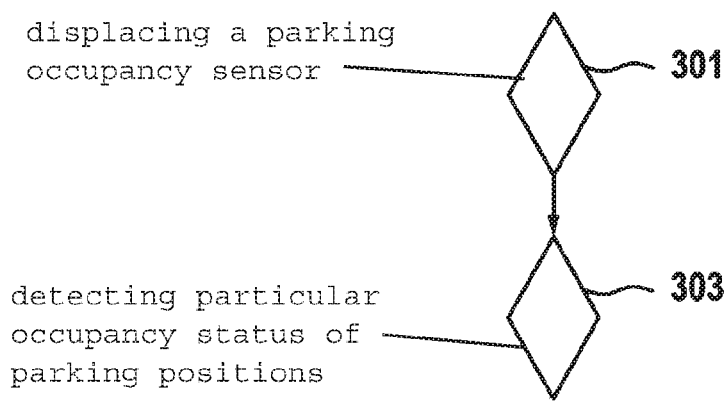
FIG. 3 shows a flow chart of a method for detecting a particular occupancy status of multiple parking positions of a parking facility.

FIG. 3 shows a flow chart of a method for detecting a particular occupancy status of multiple parking positions of a parking facility.

The method includes the following steps:
- displacing 301 a parking occupancy sensor for detecting an occupancy status of a parking position along multiple parking positions of a parking facility,
- detecting 303 the particular occupancy status of the parking positions, with the aid of the parking occupancy sensor, during the displacement.

Figure 4:
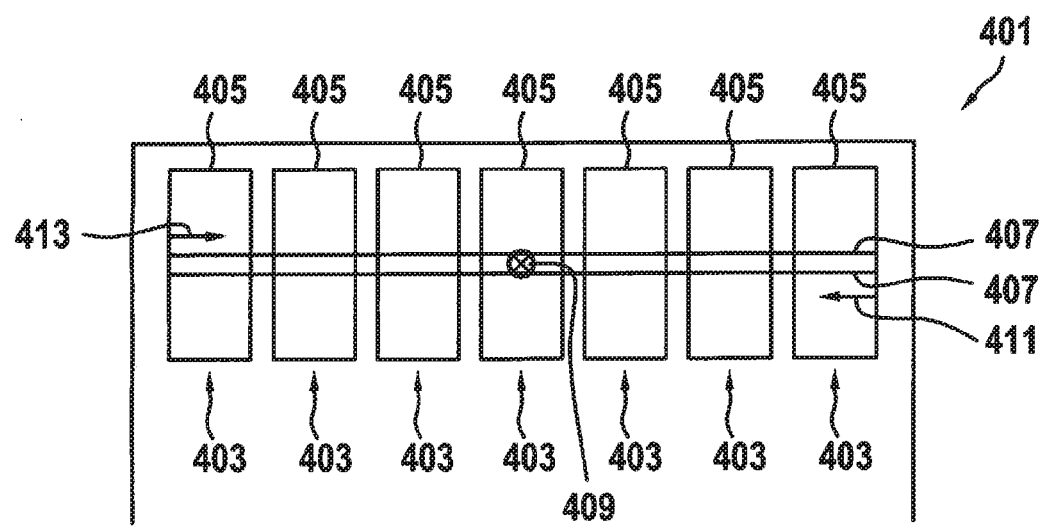
FIG. 4 shows a parking facility.

FIG. 4 shows a parking facility 401 for vehicles, in a simplified illustration viewed from above.

Parking facility 401 includes multiple parking positions 403. A vehicle 405 is parked in each of the multiple parking positions 403.

Two cables 407 are situated above vehicles 405, and thus extend above parking positions 403. A parking occupancy sensor 409 is mounted so that it is movable along the two cables 407. This is similar to a cableway, for example. Parking occupancy sensor 409 is thus moved or displaced along the two cables 407 above the parking positions 403, similarly to a cableway. During this movement or displacement, parking occupancy sensor 409 detects the particular occupancy status of parking positions 403.

Parking occupancy sensor 409 may be guided or moved along cables 407 only in two opposite directions, as symbolically indicated by two arrows having reference numerals 411, 413.

Due to the mobility of the parking occupancy sensor, it is thus also advantageously no longer necessary for a width of a parking position, for example a parking bay, to be fixed, i.e., nonvariable. Thus, for example, multiple vehicles may be parked closely to one another, and may thus also at least partially occupy a shared parking position. In this context, "as close as possible" means in particular that it is no longer possible for a vehicle door of a parked vehicle to be opened far enough to allow a driver to enter or exit the vehicle. Within the scope of an automatic parking operation this is not even necessary, since a vehicle that is parked in an automatic parking operation has no driver in the vehicle who would have to exit.

An automatic parking operation may also be referred to as automated valet parking (AVP). In this regard, a vehicle travels without a driver, i.e., by remote control or autonomously, within the parking facility in order to park at a parking position in a driverless manner. The vehicle, for example, travels in a driverless manner from a drop-off position to the parking position, the drop-off position referring to a position at which a driver of the vehicle parks the vehicle for carrying out an automatic parking operation. After parking, the vehicle travels in a driverless manner from the parking position to the pickup position, at which a person may pick up the vehicle.

In summary, the present invention provides in particular an efficient technical concept with the aid of which, for example, costs may be reduced, and with the aid of which, for example, a width of a parking bay may additionally be variably fixed.

The basic concept of the present invention is to be seen in particular in that, for example, only one parking occupancy sensor is used, which is moved or displaced by a movement system, the displacement device in the present case.

According to one specific embodiment, the displacement device moves or displaces the parking occupancy sensor along beneath the vehicles.

In another specific embodiment, the displacement device moves or displaces the parking occupancy sensor along above the vehicles.

According to another specific embodiment the displacement device moves or displaces the parking occupancy sensor along the vehicles, for example along a wall in front of the vehicles.

According to one specific embodiment, the displacement device is and/or includes a track system.

According to one specific embodiment, the displacement device is and/or includes a cable system.

According to another specific embodiment, the displacement device is and/or includes a traveling land vehicle (unmanned land vehicle), for example a model vehicle.

According to one specific embodiment, the displacement device is and/or includes a flying vehicle (unmanned aircraft), for example a drone.

According to one specific embodiment, the movement or the displacement of the parking occupancy sensor is carried out regularly, i.e., periodically, for example back and forth.

According to one specific embodiment, the movement and/or the displacement are/is controlled and/or triggered with the aid of a parking facility management system. The parking facility management system recognizes vehicle movements, for example with the aid of its monitoring systems (for example, its surroundings sensor system), and based on this information controls the displacement device as needed.

What is claimed is:

1. A system for detecting a respective occupancy status of each of multiple parking positions of a parking facility, the system comprising:
   a parking occupancy sensor for detecting a parking occupancy status;
   a surroundings sensor system for detecting surroundings of the parking positions; and
   a displacement device, that includes an unmanned aircraft, for displacing the parking occupancy sensor based on the surroundings detected by the surroundings sensor and along the parking positions, so that, due to a displacement of the parking occupancy sensor along the parking positions, the parking occupancy sensor is able to detect the occupancy statuses of the parking positions.

2. The system as recited in claim 1, wherein the displacement device is designed for periodically displacing the parking occupancy sensor along the parking positions.

3. The system as recited in claim 1, wherein the displacement device is designed for carrying out the displacement of the parking occupancy sensor in response to an external control signal.

4. The system as recited in claim 1, wherein the system includes multiple displacement devices and multiple parking occupancy sensors which are displaced with the aid of the displacement devices.

5. A method for detecting a respective occupancy status of each of multiple parking positions of a parking facility, the method comprising:
   detecting, by a surroundings sensor, surroundings of the parking positions;
   displacing, by a displacement device that includes an unmanned aircraft and based on the detected surroundings, a parking occupancy sensor for detecting the occupancy statuses of the multiple parking positions of the parking facility; and
   detecting the occupancy statuses of the parking positions with the aid of the parking occupancy sensor during the displacement.

6. A parking facility for vehicles comprising:
   multiple parking positions, and a system for detecting a respective occupancy status of each of the multiple parking positions, the system including:
      a parking occupancy sensor for detecting a parking occupancy status;
      a surroundings sensor system for detecting surroundings of the parking positions; and
      a displacement device, that includes an unmanned aircraft, for displacing the parking occupancy sensor based on the surroundings detected by the surroundings sensor and along the parking positions, so that, due to a displacement of the parking occupancy sensor along the parking positions, the parking occupancy sensor is able to detect the occupancy statuses of the parking positions.

7. The system as recited in claim 1, wherein the surroundings sensor system is configured to detect movement in areas of the parking facility and the system for detecting is configured for the displacement device to, in response to a detection by the surroundings sensor system of movement in a respective one of the areas, move the parking occupancy sensor to a location in which the parking occupancy sensor is able to detect parking occupancy statuses of parking positions in the respective area.

* * * * *